United States Patent [19]

Shiba et al.

[11] Patent Number: 5,172,288

[45] Date of Patent: Dec. 15, 1992

[54] MAGNETIC RECORDING MEDIUM AND A TAPE GUIDE IN A CARTRIDGE

[75] Inventors: Haruo Shiba; Hiroshi Kaneda; Masatoshi Okamura, all of Nagano, Japan

[73] Assignee: TDK Corporation, Japan

[21] Appl. No.: 609,833

[22] Filed: Nov. 6, 1990

[30] Foreign Application Priority Data

Nov. 10, 1989 [JP] Japan ................................. 1-291236

[51] Int. Cl.$^5$ .......................... G11B 15/16; G11B 5/70; C08L 23/06
[52] U.S. Cl. ............................... 360/132; 360/130.21; 360/134
[58] Field of Search ........ 360/132, 134, 130.2–130.21; 428/695, 900, 425.9; 242/197–201

[56] References Cited

U.S. PATENT DOCUMENTS

| | | | |
|---|---|---|---|
| 4,367,261 | 1/1983 | Miyoshi et al. | 428/330 |
| 4,452,863 | 6/1984 | Takizawa et al. | 360/134 X |
| 4,491,891 | 1/1985 | Shiba | 360/130.21 |
| 4,551,386 | 11/1985 | Yamaguchi et al. | 360/134 X |
| 4,555,443 | 11/1985 | Kikugawa et al. | 360/134 X |
| 4,567,083 | 1/1986 | Arioka et al. | 360/134 X |
| 4,578,311 | 3/1986 | Ishikuro et al. | 360/134 X |
| 4,582,757 | 4/1986 | Miyoshi et al. | 360/134 X |
| 4,587,150 | 5/1986 | Nishimatsu et al. | 360/134 X |
| 4,629,646 | 12/1986 | Ide et al. | 360/134 X |
| 4,652,496 | 3/1987 | Yasufuku et al. | 360/134 X |
| 4,663,689 | 5/1987 | Okamura et al. | 360/132 |
| 4,770,367 | 9/1988 | Carroll | 242/199 |
| 4,948,833 | 8/1990 | Araki et al. | 524/508 |

FOREIGN PATENT DOCUMENTS

| | | |
|---|---|---|
| 0192032 | 8/1986 | European Pat. Off. |
| 3415835C2 | 1/1986 | Fed. Rep. of Germany . |
| 0023834 | 11/1980 | Japan . |
| 55-155030 | 12/1980 | Japan . |
| 57-61067 | 4/1982 | Japan . |
| 57-123537 | 8/1982 | Japan . |
| 57-135439 | 8/1982 | Japan . |
| 58-108033(A) | 6/1983 | Japan . |
| 0049303 | 7/1983 | Japan . |

*Primary Examiner*—David J. Severin
*Attorney, Agent, or Firm*—Steinberg & Raskin

[57] ABSTRACT

A magnetic tape cartridge which is capable of permitting tape guides and a magnetic tape to exhibit resistance to wear and resistance to scraping sufficient to prevent the wearing of the tape guides and ensure the safe traveling of the magnetic tape over a long period of time, respectively. A polyester film forming a base of the magnetic tape contains a basic filler which absorbs a basic indicator bromothymol blue thereon while keeping it blue and a pair of the tape guides contacted with the polyester film are formed of ultra-high-molecular-weight polyolefin.

6 Claims, 1 Drawing Sheet

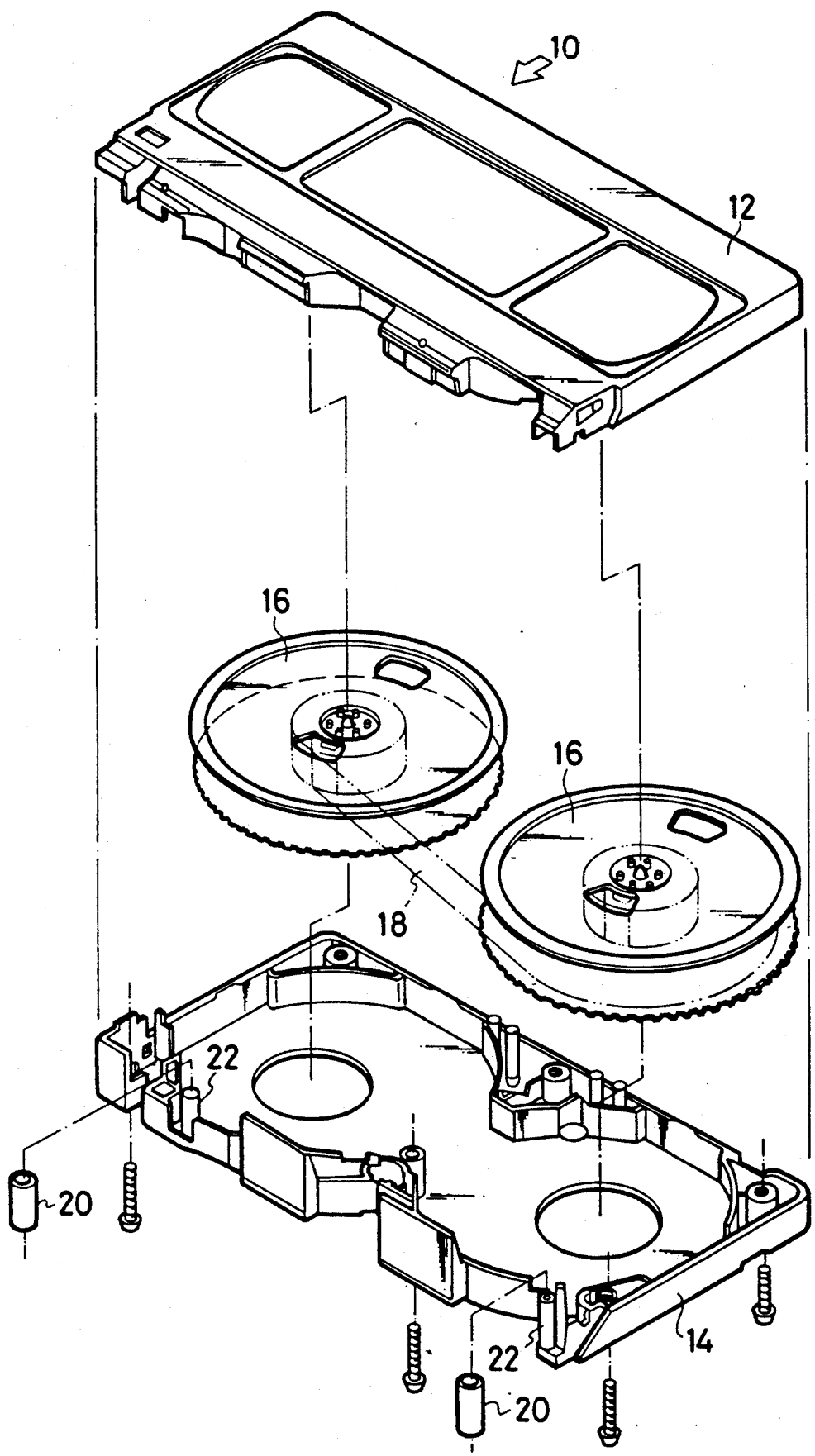

MAGNETIC RECORDING MEDIUM AND A TAPE GUIDE IN A CARTRIDGE

BACKGROUND OF THE INVENTION

This invention relates to a magnetic tape cartridge for an audio equipment, a video equipment or the like, and more particularly to a magnetic tape cartridge including a magnetic tape arranged in a casing for recording and playing-back.

Generally, in a magnetic tape cartridge of such type, a magnetic tape is arranged in a casing while being kept contacted with tape guides for guiding traveling of the tape. Thus, in use of the magnetic tape cartridge, the magnetic tape travels while being contacted with the surface of each of the tape guides, so that the tape guides are conventionally made of a metal material exhibiting rub resistance and resistance to wear. Unfortunately, this causes the processing and manufacturing costs of the cartridge to be significantly increased. In order to avoid the disadvantage, a synthetic resin material such as polyacetal resin, polyamide resin, ultra-high-molecular-weight polyethylene or the like is used for the tape guides so as to permit them to exhibit satisfactory rub resistance and resistance to wear for a long period of time, as disclosed in Japanese Utility Model Publication No. 23834/1985.

More particularly, the tape guides are made of a synthetic resin material mainly consisting of polyacetal, because it facilitates formation of the tape guides and is not costly as compared with a metal material. Unfortunately, the result of an endurance traveling test which the inventors carried out on tape guides made of such a synthetic material revealed that the material tends to cause the tape guides to produce powdered dust by wearing due to contacting with the magnetic tape over a long period of time, which then adheres to the surface of a magnetic tape, to thereby lead to dropout of data recorded on the tape. Also, the wearing of the tape guides causes scraping of the tape. In particular, a conventional magnetic tape which is made of a polyester film having a magnetic layer deposited thereon and of which the surface contacted with the tape guides is 0.010 to 0.014 µm in roughness is significantly increased in frictional resistance to the tape guides made of a synthetic resin material such as the above-described material mainly consisting of polyacetal, to thereby increase rewinding torque and deteriorate jitter (reproduced image), leading to lowering of the quality.

SUMMARY OF THE INVENTION

The present invention has been made in view of the foregoing disadvantages of the prior art.

Accordingly, it is an object of the present invention to provide a magnetic tape cartridge which is capable of ensuring the safe operation of a magnetic tape over a long period of time.

It is another object of the present invention to provide a magnetic tape cartridge which is capable of permitting a type guide means to exhibit resistance to wear sufficient to ensure the safe traveling of a magnetic tape over a long period of time.

It is a further object of the present invention to provide a magnetic tape cartridge which is capable of preventing the traveling of a magnetic tape from wearing a casing to produce dust.

It is still another object of the present invention to provide a magnetic tape cartridge which is capable of permitting a magnetic tape to exhibit resistance to scraping sufficient to ensure the safe and positive operation of the tape over a long period of time.

It is yet another object of the present invention to provide a magnetic tape cartridge which is capable of safely operating a magnetic tape while preventing data stored on the tape from being dropped out.

It is a still further object of the present invention to provide a magnetic tape cartridge which is capable of being assembled and manufactured at a low cost.

It is a yet further object of the present invention to provide a magnetic tape cartridge which is capable of being significantly decreased in weight.

In accordance with the present invention, a magnetic tape cartridge is provided. The magnetic tape cartridge includes a magnetic tape drawably wound on a pair of tape holders rotatably arranged in a casing and including a polyester film and a magnetic layer formed on at least one of both surfaces thereof and a tape guide means for guiding the traveling of the magnetic tape in the casing while keeping the magnetic tape contacted therewith. The polyester film of the magnetic tape includes a means for improving resistance to scraping of the magnetic tape. The tape guide means contacted with the polyester film of the magnetic tape is made of a ultra-high-molecular-weight polyolefin.

In a preferred embodiment of the present invention, the means for improving resistance to scraping of the magnetic tape is formed by incorporating, into the polyester film, a filler capable of absorbing bromothymol blue, which is a basic indicator, thereon while keeping it blue.

Alternatively, the means for improving resistance to scraping of the magnetic tape comprises a lubricating layer made of a material mainly consisting of carbon, nitrocellulose and urethane and is arranged on the surface of the magnetic tape contacted with the tape guide means.

BRIEF DESCRIPTION OF THE DRAWING

These and other objects and many of the attendant advantages of the present invention will be readily appreciated as the same becomes better understood by reference to the following detailed description when considered in connection with the accompanying drawing; wherein:

the single figure is an exploded perspective view showing an embodiment of a magnetic tape cartridge according to the present invention.

DETAILED DESCRIPTION OF THE PREFERRED EMBODIMENT

Now, the present invention will be described hereinafter with reference to the accompanying drawing.

The single figure shows an embodiment of a magnetic tape cartridge according to the present invention. A magnetic tape cartridge of the illustrated embodiment includes a casing 10 comprising an upper casing member 12 and a lower casing member 14 joined together to define a space in the so-formed casing 10. In the casing 10 are rotatably arranged a pair of tape holders or tape reels 16, on which a magnetic tape is drawably wound so as to be stretched therebetween. The magnetic tape 18 includes a polyester film and a magnetic layer deposited or formed on at least one of both surfaces of the polyester film. Also, in the casing 10 is arranged a tape guide means 20 for guiding the traveling of the magnetic tape 18 in the casing 10, so that the magnetic tape 18 travels while being kept contacted with the tape guide means 20. In the illustrated embodiment, the tape guide means 20 comprises two tape guides rotatably arranged in the casing 10. The polyester film of the magnetic tape 18 includes a means for improving resistance to scraping of the magnetic tape, which, in the illustrated embodiment, is constructed by incorporating, into the polyester film of the magnetic tape 18, a basic filler capable of absorbing bromothymol blue thereon, which is a basic indicator, in the form of a blue color or while keeping it blue. Also, the tape guides 20 contacted with the polyester film of the magnetic tape 18 each are made of ultra-high-molecular-weight polyolefin.

The filler which exhibits basic properties typically includes $Al_2O_3$. A filler other than the basic filler is not suitable for use for the magnetic tape 18 in the present invention, because it fails to provide the magnetic tape or polyester film with satisfactory resistance to scraping or grinding. The words "resistance to scraping" or "resistance to grinding" used herein in connection with the magnetic tape indicate properties of the magnetic tape which prevent it from being rubbed off or scraped off due to contacting with the tape guides during the traveling. Also, bromothymol blue is preferably used as the basic indicator, because it carries out color change at a suitable pH value when conformability between the polyester film and the filler is judged and it attains color development when it is absorbed on the filler. The filler is desirable to have a size of 5 $m^2/g$ or more based on a BET value. The BET value below 5 $m^2/g$ deteriorates the surface properties of the non-magnetic support of the magnetic tape, to thereby remarkably adversely affect the electromagnetic conversion characteristics of the magnetic tape formed. Also, the amount of the filler added to the polyester film is preferably less than 5% by weight.

An increase in the amount of addition of the basic filler to the polyester film causes the magnetic tape to exhibit improved resistance to scraping correspondingly. However, it renders the surface of the magnetic tape 18 rough correspondingly, so that the magnetic tape fails to exhibit satisfactory electromagnetic conversion characteristics. Also, it increases the wearing of the tape guides 20. Thus, it was found that the surface of the magnetic tape 18 contacted with the tape guides 20 preferably has roughness within a range between 0.015 μm and 0.023 μm based on Ra (center line average height) measured according to a surface roughness testing method defined in JIS (Japanese Industrial Standard) B0601.

The tape guides 20, in the illustrated embodiment, each comprise a roller made of a ultra-high-molecular-weight polyolefin which exhibits satisfactory resistance to wear, sliding properties and self-lubricating properties. The so-formed rollers 20 each are rotatably fitted on a support pin 22, so that the magnetic tape which is adapted to be delivered from one of the tape reels 16 and wound up on the other tape reel may travel while being contactedly guided along the outer periphery of each of the rollers 20. The tape guides 20 are preferably made of ultra-high-molecular-weight polyethylene of a molecular weight as high as 800,000 or more which has good wearing characteristics, because it does not produce powders or dust due to wearing even after the tape travels thereon over a long period of time. For example, an experiment by the inventors revealed that a material consisting of ultra-high-molecular-weight polyethylene having a molecular weight of 800,000 or more as a main component and an inorganic material in an amount of 10 to 40% by weight as a filler is preferably used for the tape guides, because it effectively prevents both tape guides and magnetic tape from being damaged due to wearing, scraping and the like. The inorganic material used as the filler includes, for, example, aluminum silicate or the like.

In the magnetic tape cartridge of the present invention, the means for improving resistance to scraping of a magnetic tape may comprise a lubricating layer made of a material mainly consisting of carbon, nitrocellulose and urethane and arranged on the surface of the magnetic tape contacted with the tape guides. This results in the resistance to scraping of the magnetic tape being substantially improved.

The following table shows the results of a tape traveling test which the inventors carried out on the tape guides in both the above-described embodiment and the prior art.

TABLE

| Tape Guide | | Brass | Polyacetal | | UHMW Polyolefin | | | Evaluation Data |
|---|---|---|---|---|---|---|---|---|
| Base Filler Roughness | (nm) | PA 10-14 | PA 10-14 | Embo 15-23 | Embo 10-14 | Embo 15-23 | Embo 24- | of Lubricating Layer Backcoat |
| Rew Time *1 | Number of Passes | 50 | 0 | 29 | 0 | 50 | 40 | 50 |
| | Time (sec) | 5.7 | — | 7.7 | — | 5.3 | 8.7 | 5.8 |
| | Tape Scratch | ◯ | — | Δ | — | ◯ | Δ | ◯ |
| | Guide Scratch | ◯ | — | Δ~X | — | ◯ | Δ~X | ◯ |
| DO Measurement after 50 Passes of FF-Rew*2 | Dropout | OK | NG | OK | NG | OK | NG | OK |
| | Tape Scratch | ◯ | X | ◯ | Δ | ◯ | Δ | ◯ |
| | Guide Scratch | ◯ | X | Δ | Δ | ◯ | X | ◯ |
| DO Measurement after 100 Passes of Play-Rew*3 | Dropout | OK | NG | NG | NG | OK | NG | OK |
| | Tape Scratch | ◯ | X | Δ | X | ◯ | X | ◯ |
| | Guide Scratch | ◯ | X | X | Δ | ◯ | X | ◯ |

Remarks:
UHMW: Ultra-High-Molecular-Weight
PA: Prior Art, Embo: Embodiment
*1: Time required for traveling a tape for 20 seconds and rewinding it under torque of 250 g · cm using a general purpose tape deck. The operation was repeated fifty times.
*2, *3: Dropout measured after traveling of a tape using a general purpose tape deck.
OK: 35 dropouts/min or less.
◯: Equal to the prior art.
Δ: Somewhat inferior to the prior art.
X: Inferior to the prior art.

As can be seen from the foregoing, the present invention is so constructed that the polyester film of the magnetic tape contains the basic filler which absorbs a basic indicator bromothymol blue thereon while keeping it blue and the tape guide means contacted with the polyester film is formed of ultra-high-molecular-weight polyolefin. Such construction provides the magnetic tape and tape guide means with good resistance to scraping and resistance to wear, respectively, resulting in preventing dropout of date stored on the magnetic tape and preventing the tape guide means from producing powders or dust due to wearing, while significantly reducing the processing costs and weight of the tape guide means as compared with the metal tape guides in the prior art. Thus, the magnetic tape cartridge of the present invention is effectively improved in quality and ensures the safe and positive operation over a long period of time. Also, the present invention contributes to a decrease in weight of the cartridge and a reduction in manufacturing cost of the cartridge.

While a preferred embodiment of the present invention has been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A magnetic tape cartridge comprising:

a magnetic tape drawably wound on a pair of tape holders rotatably arranged in a casing and including a polyester film and a magnetic layer formed on at least one of both surfaces thereof;

a tape guide means for guiding the traveling of said magnetic tape in said casing while keeping said magnetic tape contacted therewith; said polyester film of said magnetic tape including means for resisting scraping of said magnetic tape comprising a filler incorporated into said polyester film, said filler being capable of absorbing a basic indicator comprising bromothymol blue thereon while keeping it blue; said filler having a size of 5 m²/g based on BET value; and said tape guide means contacted with said polyester film of said magnetic tape being made of a ultra-high-molecular-weight polyolefin comprising an ultra-high-molecular-weight polyethylene having a molecular weight of at least 800,000.

2. A magnetic tape cartridge as defined in claim 1, wherein said magnetic tape is formed on the surface thereof contacted with said tape guide mans into surface roughness surface within a range between 0.015 μm and 0.23 μm based on Ra (center line average height) determined according to a surface roughness testing method defined in JIS B0601.

3. A magnetic tape cartridge as defined in claim 1, wherein said tape guide means is made of a material consisting of ultra-high-molecular-weight polyethylene having a molecular weight of 800,000 or more as a main component and aluminum silicate of 10 to 40% by weight as a filler, 4. A magnetic tape cartridge as defined in claim 1, wherein said filler is Al₂O₃;

said Al₂O₃ being added in an amount less than 5% by weight.

5. A magnetic tape cartridge as defined in claim 1, wherein said means for resisting scraping of said magnetic tape comprises a lubricating layer made of a material mainly consisting of carbon, nitrocellulose and urethane and is arranged on the surface of said polyester film of said magnetic tape contacted with said tape guide means.

6. A magnetic tape cartridge comprising:

a magnetic tape drawably wound on a pair of tape holders rotatably arranged in a casing and including a polyester film and a magnetic layer formed on at least one of both surfaces thereof;

a tape guide means for guiding the traveling of said magnetic tape in said casing while keeping said magnetic tape contacted therewith; said polyester film of said magnetic tape containing a filler capable of absorbing a basic indicator comprising bromothymol blue thereon while keeping it blue; said filler has a size of 5 m²/g based on a BET value; and said tape guide means contacted with said polyester film of said magnetic tape being made of a ultra-high-molecular-weight polyolefin comprising an ultra-high-molecular-weight polyethylene having a molecular weight of at least 800,000.

* * * * *